(12) United States Patent
Georgiou et al.

(10) Patent No.: US 12,498,022 B2
(45) Date of Patent: Dec. 16, 2025

(54) LOSSLESS CONTINUOUSLY ADJUSTABLE DEVICES

(71) Applicants: THE REGENTS OF THE UNIVERSITY OF CALIFORNIA, Oakland, CA (US); CAMBRIDGE ENTERPRISE LIMITED, Cambridge (GB)

(72) Inventors: Tryphon T. Georgiou, Los Angeles, CA (US); Malcolm Clive Smith, Cambridge (GB); Faryar Jabbari, Los Angeles, CA (US); Neil E. Houghton, Cambridge (GB)

(73) Assignees: The Regents of the University of California, Oakland, CA (US); Cambridge Enterprise Limited, Cambridge (GB)

( * ) Notice: Subject to any disclaimer, the term of this patent is extended or adjusted under 35 U.S.C. 154(b) by 229 days.

(21) Appl. No.: 17/610,920

(22) PCT Filed: May 13, 2020

(86) PCT No.: PCT/US2020/032731
§ 371 (c)(1),
(2) Date: Nov. 12, 2021

(87) PCT Pub. No.: WO2020/232160
PCT Pub. Date: Nov. 19, 2020

(65) Prior Publication Data
US 2022/0228652 A1    Jul. 21, 2022

Related U.S. Application Data

(60) Provisional application No. 62/848,362, filed on May 15, 2019.

(51) Int. Cl.
*F16H 21/00* (2006.01)
*B60G 13/00* (2006.01)
(Continued)

(52) U.S. Cl.
CPC .............. *F16H 21/00* (2013.01); *B60G 13/00* (2013.01); *F16H 13/00* (2013.01); *H01F 21/02* (2013.01); *H02K 21/00* (2013.01)

(58) Field of Classification Search
CPC .......... F16H 21/00; F16H 13/00; F16H 15/40; B60G 13/00; H01F 21/02; H02K 21/00
See application file for complete search history.

(56) References Cited

U.S. PATENT DOCUMENTS 1,128,460 A * 2/1915 Kubitz et al. ........... F16H 15/20
                                                      476/51
3,698,255 A * 10/1972 Schott .................... F16H 15/40
                                                      476/22

(Continued)

OTHER PUBLICATIONS

Foreign Search Report on PCT PCT/US2020/032731 Dtd Oct. 19, 2020.

(Continued)

*Primary Examiner* — Terence Boes
(74) *Attorney, Agent, or Firm* — Foley & Lardner LLP

(57) ABSTRACT

Embodiments of this disclosure are directed to devices that allow for adjusting of device parameters in a manner that does not involve power dissipation in an essential way. Thus, power demands when such devices are used in applications can be insignificant. This applies to both springs and inerters, which constitute basic lossless building blocks of mechanical device systems, and are analogues of inductors and capacitors in electrical circuits. Embodiments of this disclosure are also directed to a lossless adjustable 2-port transformer, and realization of mechanical translational and rotary transformers are set forth in the following. Embodi- (Continued)

Section Y-Y ments of this disclosure allow for reduction of power demands in adjusting device parameters.

14 Claims, 12 Drawing Sheets

(51) Int. Cl.
  *F16H 13/00* (2006.01)
  *H01F 21/02* (2006.01)
  *H02K 21/00* (2006.01)

(56) References Cited

U.S. PATENT DOCUMENTS

| | | | |
|---|---|---|---|
| 3,820,408 A * | 6/1974 | Louis | F16H 15/44 476/51 |
| 3,926,061 A | 12/1975 | Paulson | |
| 5,456,341 A | 10/1995 | Garnjost et al. | |
| 5,632,703 A | 5/1997 | Wilkes et al. | |
| 5,984,062 A | 11/1999 | Bobrow et al. | |
| 7,042,317 B2 | 5/2006 | Xiao et al. | |
| 2005/0034943 A1 | 2/2005 | Smith | |
| 2007/0114104 A1 | 5/2007 | Manfredotti et al. | |
| 2009/0229391 A1 | 9/2009 | Eakin | |
| 2009/0312137 A1 | 12/2009 | Rohs et al. | |
| 2011/0187036 A1 | 8/2011 | Duval | |
| 2012/0199428 A1 | 8/2012 | Smith et al. | |
| 2022/0042573 A1* | 2/2022 | Yoshikawa | F16D 3/12 |

OTHER PUBLICATIONS

Malcolm C. Smith, "Synthesis of Mechanical Networks: The Inerter", Oct. 10, 2002, pp. 1648-1662.

Tryphon T. Georgiou, "Principles Of Lossless Adjustable One-Ports", May 16, 2019, pp. 1-10.

* cited by examiner

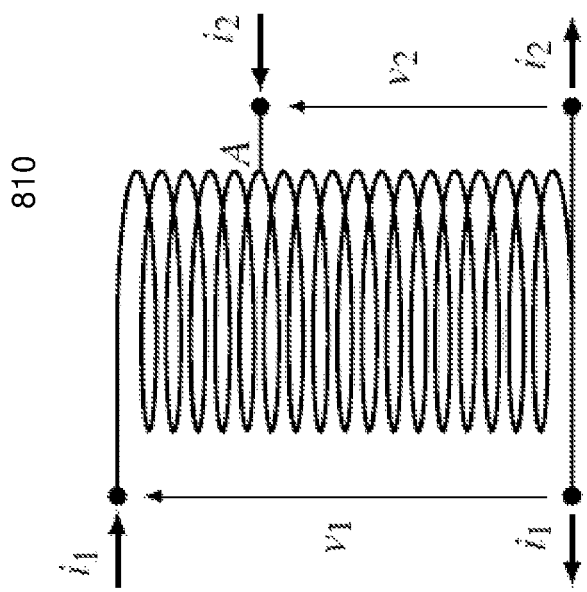

LOSSLESS CONTINUOUSLY ADJUSTABLE DEVICES

RELATED APPLICATIONS

This application is a 371 National Stage Entry of International Application No. PCT/US2020/032731, filed May 13, 2020, which claims the domestic benefit under Title 35 of the United States Code § 119 (e) of U.S. Provisional Patent Application Ser. No. 62/848,362, entitled "Lossless Continuously Mechanical Devices," filed May 15, 2019, which are hereby incorporated by reference in their entirety and for all purposes as if completely and fully set forth herein.

TECHNICAL FIELD

This disclosure relates generally to mechanical devices, including but not limited to lossless continuously adjustable mechanical devices.

BACKGROUND

Adjustable devices such as springs are desired in a wide range of applications and, in particular, in robotics, prostheses, and so on. There are also applications in vehicle suspension systems, vibration absorbers, building suspensions, vibration mounts, and so forth. Yet comparative implementations are semi-active devices that specify in an essential way power to be available and used, as the devices dissipate energy in various regimes and modalities. Also, continuously variable (2-port) transformers are desired, as are electrical counterparts (e.g., a variac). However, such devices specify power to operate in an essential way. The power that is specified for continuous adjustment of ratios at the two terminals is significant. It is against this background that a need arose to develop the embodiments described herein.

SUMMARY

Embodiments of this disclosure are directed to devices that allow for adjusting of device parameters in a manner that does not involve power dissipation in an essential way. Thus, power demands when such devices are used in applications can be insignificant. This applies to both springs and inerters, which constitute basic lossless building blocks of mechanical device systems, and are analogues of inductors and capacitors in electrical circuits. Embodiments of this disclosure are also directed to a lossless adjustable 2-port transformer, and realization of mechanical translational and rotary transformers are set forth in the following. Embodiments of this disclosure allow for reduction of power demands in adjusting device parameters.

This disclosure sets forth a concept and realization of a lossless continuously adjustable mechanical device. This disclosure sets forth six related examples of such a device: a lossless adjustable translational spring, a lossless adjustable rotary spring, a lossless adjustable translational inerter, a lossless adjustable rotary inerter, a lossless adjustable translational 2-port transformer, and a lossless adjustable rotary 2-port transformer. In each of these examples, a feature of the device is that it allows operation where a device parameter can be continuously adjusted without the specification for any significant amount of power. Other comparative devices that are continuously adjustable specify a source power that is used in an essential way since the devices are lossy. The concept and implementation of a lossless continuously adjustable mechanical device allows the feature of an adjustable parameter to be effected in a lossless manner.

In some embodiments, a lossless adjustable mechanical device is a mechanical device including terminals (e.g., attachment points) which allow connection with other devices. Such a device has no internal power source, namely it is a passive device, and it dissipates little or no energy during operation. The device is continuously adjustable in the sense that a parameter of the device can be freely adjusted in time. Embodiments of this disclosure encompass six related examples of such a device.

Example 1 (lossless adjustable translational spring). This is a two-terminal device which satisfies the device law: $v(t)=p(t) \cdot D(p(t) \cdot F(t))$ where $v(t)$ is the relative velocity between the terminals, $p(t)$ is a freely adjustable positive parameter, $F(t)$ is the equal and opposite force between the terminals, and D denotes the differential operator. Applications of such a device can be found in vehicle suspension systems, vibration absorbers, building suspensions, vibration mounts, robotics, and so on.

Example 2 (lossless adjustable rotary spring). This is a two-terminal device which satisfies the device law: $w(t)=p(t) \cdot D(p(t) \cdot T(t))$ where $w(t)$ is the relative angular velocity between the terminals, $p(t)$ is a freely adjustable positive parameter, $T(t)$ is the equal and opposite torque between the terminals, and D denotes the differential operator.

Example 3 (lossless adjustable translational inerter). This is a two-terminal device which satisfies the device law: $F(t)=r(t) \cdot D(r(t) \cdot v(t))$ where $v(t)$ is the relative velocity between the terminals, $r(t)$ is a freely adjustable positive parameter, $F(t)$ is the equal and opposite force between the terminals, and D denotes the differential operator.

Example 4 (lossless adjustable rotary inerter). This is a two-terminal device which satisfies the device law: $T(t)=r(t) \cdot D(r(t) \cdot w(t))$ where $w(t)$ is the relative angular velocity between the terminals, $r(t)$ is a freely adjustable positive parameter, $T(t)$ is the equal and opposite torque between the terminals and D denotes the differential operator.

Example 5 (lossless adjustable translational 2-port transformer). This is a four-terminal device which satisfies the device law: $F1(t)=p(t) \cdot F(t)$ and $v1(t)=-v(t)/p(t)$, where $F1(t)$ is the equal and opposite force between two of the terminals, $F(t)$ is the force between the other two terminals, $p(t)$ is a freely adjustable positive parameter, $v1(t)$ is the relative velocity between two of the terminals and $v(t)$ is the relative velocity between the other two terminals.

Example 6 (lossless adjustable rotary 2-port transformer). This is a four-terminal device which satisfies the device law: $T1(t)=p(t) \cdot T(t)$ and $w1(t)=-w(t)/p(t)$ where $w1(t)$ is the relative angular velocity between two of the terminals, $w(t)$ is the relative angular velocity between the other two terminals, $p(t)$ is a freely adjustable positive parameter, $T1(t)$ is the equal and opposite torque between two of the terminals and $T(t)$ is the torque between the other two terminals.

In some embodiments, a mechanical arrangement for an adjustable translational spring or inerter includes a spring, or an inerter, that is coupled through a lever with a variable or moveable pivot or fulcrum, and allows, via a suitable adjustment of a position of the pivot, lossless adjustable operation and a device law that, for a stationary position of the pivot, behaves as a normal spring or inerter. A corresponding mechanical arrangement for an adjustable rotary spring or inerter includes the connection of a normal rotary spring or rotary inerter across one of two ports of a lossless adjustable rotary 2-port transformer. A realization of such a lossless adjustable 2-port transformer includes two cones that are coupled through a moveable rolling assembly including a pair of rolling balls. This arrangement allows a continuous lossless adjustment of relative angular velocities of the cones, and accordingly, torques that are being applied at the two ports. In principle, no power is specified for operation. In practice, a small amount of power may be included to overcome friction of the rolling balls.

Applications for devices having adjustable parameters and transformer ratios during operation abound, from ordinary bicycles to complicated machinery. It is desired to avoid placing demands on an available power source with significant amounts of power consumption for such adjustments. Adjustable devices of some embodiments allow for changing the parameters of the devices (e.g., spring, inerter, transformer) in a continuous and lossless manner.

A lossless continuously adjustable spring has wide applications in suspension systems, robotics, variable stiffness actuators in medical applications, and so on. Similarly, a lossless continuously adjustable inerter and continuous adjustable transformer have applications for control purposes in various mechanical designs. These could be especially beneficial in applications where a main power source is constrained, such as batteries which have constrained capacity.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIG. 8 illustrates an exemplary electrical autotransformer.

DETAILED DESCRIPTION

Figure 1:
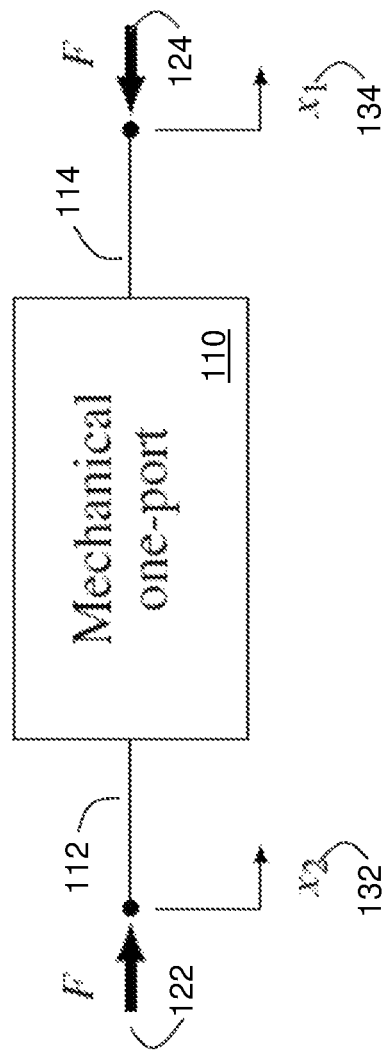
FIG. 1 illustrates an exemplary free-body diagram of a one-port (two-terminal) mechanical component or network with force-velocity pair (F,v) where v=x', x=x2−x1.

Embodiments of this disclosure are directed to the construction of two-terminal mechanical devices (one-ports) which are lossless and adjustable. To be lossless, the device should be passive (e.g., not involving a power supply) and non-dissipative. To be adjustable, a parameter of the device should be freely variable in real time as a control input. For the simplest lossless one ports, the spring and inerter, the question is whether the stiffness and inertance may be varied freely in a lossless manner. Conventional laws for adjustable springs and inerters are active and that it is not straightforward to modify them to achieve losslessness, or indeed passivity. By way of a physical construction using a lever with moveable fulcrum, derivation is made of device laws for adjustable springs and inerters which satisfy a formal criterion of losslessness. Further provided is a construction method which does not involve a power supply for physically realizable translational and rotary springs and inerters. The analogous questions for lossless adjustable electrical devices are examined.

I. INTRODUCTION

A question to be addressed is whether a spring can be constructed with a "workless knob" which freely adjusts its stiffness in real time. Such a device would behave like a normal linear spring when the knob is stationary. Energy imparted through compression or extension would be available for extraction again. Adjustment of the knob would not involve any energy transfer between the environment and the device. Comparative methods to adjust the stiffness of springs do not answer this question, since they involve active actuation, dissipation, or restrictive conditions on the switching of the spring constant. An answer to this and related questions is provided in the following.

The question is motivated by an adjustable damper. Such devices allow their proportionality constant to be adjusted, typically by a variable orifice controlled by a solenoid valve, or a magnetorheological fluid whose viscosity is altered by a magnetic field. Adjustable dampers can be used for the control of mechanical systems, e.g., automotive suspensions. The variable damper constant plays the role of a control input which may be adjusted by a control law that minimizes a performance criterion. Such devices are sometimes termed "semi-active" since a (small) power source is employed to effect the adjustment. Nevertheless, the instantaneous power absorbed by the device is not negative, and so from a terminal point of view it appears passive. It is reasonable to expect that adjustable springs with similar properties would also provide performance advantages in a control system which would make them attractive in applications.

An analogous question arises for an inerter, which is a two-terminal mechanical device such that the equal and opposite force at the terminals is proportional to the relative acceleration between them. The constant of proportionality is termed the inertance. The question is whether an adjustable inerter is physically realizable as a lossless device, namely whether an inerter can be manufactured with a "workless knob" which freely adjusts its inertance in real time.

In the robotics field "Variable Stiffness Actuators" are considered. There are three principal methods to construct variable stiffness devices: adjustable spring preload; variable transmission or gearing ratio; and change of physical properties of the spring. The methods described each involve some form of active force input, most commonly electromechanical actuation.

An exemplary passive "resettable" spring provides reduced energy for switching. A piston and cylinder arrangement acts in parallel with a spring so that the closing of a valve allows the fluid in the cylinder to play the role of an additional spring. In its simplest form this allows switching between two different levels of stiffness. The closing of the valve (to increase the stiffness) can be effected at any time with reduced energy input. The opening of the valve (to reduce the stiffness) is constrained to times at which there is no stored energy in the fluid, otherwise there is energy dissipation. Control problems are considered which respect to the constraint on the timing of valve opening.

The possible benefits of adjustable inerters are considered in another approach. A device law of a "semi-active" inerter is evaluated for a vehicle suspension system without considering the issue of realizability. An exemplary tuned mass damper (TMD) incorporates an adjustable inerter making use of a rack and pinion and continuously variable transmission (CVT). The CVT allows precise tuning of the natural frequency of the TMD, but energy specifications for the adjustment of the CVT are not considered.

In another approach, the stability of control systems incorporating "semi-active" devices is considered. It is pointed out that the commonly assumed device laws for "variable-stiffness springs" and "variable-inertance inerters" are in fact active, and that interconnections of such devices with passive elements may lead to instability. A mechanical design for an (active) adjustable inerter is presented and evaluated in the context of vibration suppression of a building structure. The potential benefits as well as the risk of instability are highlighted.

The embodiments presented are directed to physically realizable device laws that are both lossless and adjustable, without restrictions on the values and timing of their control input parameter. Physical implementations of such device laws are envisioned as control components in application areas that include the aforementioned areas of robotics, vibration suppression in buildings, and automotive suspension. The control considerations that result can include addressing their non-linear character (e.g., where the control input multiplies a state).

The following disclosure is structured as follows. In Section II the basic criteria of mechanical one-ports, adjustability, passivity and losslessness are provided. Section III shows in a series of six examples that none of the assumed device laws for adjustable springs or inerters or variants are lossless, and indeed all are non-passive, namely active. Section IV uses an idealized mechanical arrangement of a lever with moveable fulcrum to derive device laws for lossless adjustable springs and inerters. Section V presents a physical implementation of the moveable fulcrum concept without internal power source and introduces the names of varspring and varinerter for the canonical lossless adjustable spring and inerter. Section VI presents a method for physical implementation of rotary varsprings and varinerters. The disclosure concludes with a discussion of the analogous device laws in the electrical domain in Section VII.

II. MECHANICAL ONE-PORTS

FIG. 1 illustrates (a) an exemplary free-body diagram 100 of a one-port (two-terminal) mechanical component or network with force-velocity pair (F,v) where v=x', x=x2−x1.

Consideration is made of (idealized) mechanical components or networks which take the form of a mechanical one-port as shown by way of example in FIG. 1. Exemplary one-port 110 has two terminals 112 and 114 for connection to other components or networks. The terminals 112 and 114 are subject to an equal and opposite force F 122 and 124 and have absolute displacements $x_1$ 134 and $x_2$ 132. FIG. 1 illustrates the sign convention whereby a positive F corresponds to a compressive force and a positive $x=x_2-x_1$ corresponds to the terminals moving towards each other. The force F 122 and 124 is an example of a through-variable and the relative displacement x (and relative velocity x' and relative acceleration x") is an across-variable. Either or neither of the variables may be considered an "input". A device law for a mechanical one-port is a relation between through- and across-variables. As used herein, the singular terms "a," "an," and "the" may include plural referents unless the context clearly dictates otherwise. Thus, for example, reference to an object may include multiple objects unless the context clearly dictates otherwise.

The three basis linear, passive, time-invariant mechanical one-port components with two independently moveable terminals are the spring, damper and inerter with ideal modelling equations: $F(t)=kx(t)$, $F(t)=cx'(t)$ and $F(t)=bx''(t)$ where k>0, c>0 and b>0. In the force-current mechanical-electrical analogy these components are analogous to the inductor, resistor and capacitor respectively. The mass component may also be considered to be a one-port as in FIG. 1 with the mass being rigidly attached to terminal two, and terminal one being a fixed point in the inertial frame of reference, and as such is analogous to a grounded capacitor. It is implicit in the specification of the spring, damper and inerter that they have negligible mass compared to any masses to which they are connected.

Mechanical one-ports in rotary form have two terminals which are independently rotatable about a common axis. The rotary spring, damper and inerter are characterized by the equal and opposite torque applied to the terminals being proportional to the relative angular displacement, velocity and acceleration between the terminals respectively. A pure inertia on a rotating shaft has a single terminal that can be rotated independently and, like the mass, is analogous to a grounded capacitor.

Adjustable one-ports. A one-port is specified to be adjustable if it has a parameter which may be freely varied as a function of time. Such a parameter is considered to be a manipulable input to the device. It allows the device to become part of a control system in which the parameter is adjusted by scheduling or feedback. An example of an adjustable one-port is the variable damper specified by:

$$F(t) = c(t)\dot{x}(t),\ 0 < c_{min} \le c(t) c_{max} \quad (1)$$

where c(t) is the adjustable damper rate, and $c_{min}$, $c_{max}$ are minimum and maximum allowed values.

Passivity and losslessness. The device laws considered in this disclosure may be written in differential form:

$$h(F(t), \dot{F}(t), \ldots, x(t), \dot{x}(t), \ldots, u(t), \dot{u}(t), \ldots) = 0 \quad (2)$$

for some function h, where F(t) and x(t) are specified in Section II-A and u(t) is a manipulable input. Consideration is made of the set of (locally integrable, weak) solutions to (2) as the behavior of the device in the sense of:

$$\mathscr{B} = \{(F(t), x(t), u(t)) \in \mathscr{L}_1^{loc}(\mathbb{R}, \mathbb{R}^3) \text{ s.t.}(2) \text{ holds}\}, \quad (3)$$

where $$\mathscr{L}_1^{loc}(\mathbb{R}, \mathbb{R}^3)$$

denotes the functions from R into $\mathbb{R}^3$ that are Lebesgue integrable on any finite interval. Adoption is made of the following criteria of passivity.

Criterion 1: The device law (2) is passive if, for any $(F(t),x(t),u(t)) \in B$ and $t_0 \in R$, there exists $K \in R$ such that:

$$\int_{t_0}^{t_1} F(t)\dot{x}(t)dt \geq -K$$

for all $t_1 \geq t_0$, and where K is independent of $\{(F(t),x(t),u(t)) | t > t_0\}$. The criterion expresses that, for any trajectory, and starting at any particular time, the net amount of energy that may be extracted subsequently from the device cannot be arbitrarily large, namely:

$$-\int_{t_0}^{t_1} F(t)\dot{x}(t)dt \leq K.$$

The provision that K may depend on $t_0$ and on the trajectory prior to $t_0$, but is independent of possible future trajectories, is included, where its importance is illustrated in time-varying and non-linear cases.

Single-input single-output systems are considered whose behavior is specified by the solutions to the equation:

$$p\left(\frac{d}{dt}\right)F(t) = q\left(\frac{d}{dt}\right)v(t) \quad (45)$$

where p and q are real polynomials (where v(t)=x'(t)). The behavior is passive if g(s)=p(s)/q(s) is a positive-real function and p(s) and q(s) have no common roots in the closed right half plane, unless g(s)+g(−s)=0 in which case p(s) and q(s) are coprime. It may be observed that the device law (1) satisfies:

$$\int_{t_0}^{t_1} F(t)\dot{x}(t) = \int_{t_0}^{t_1} c(t)\dot{x}(t)^2 dt \geq 0$$

for any $t_0 \leq t_1$, and hence such devices are passive in a formal sense. Sometimes the terminology "semi-active" is used since a small amount of power may be involved in practice to make the adjustments. The approach in this disclosure is to classify devices as passive in terms of their terminal behavior according to Criterion 1, or if not, to refer to them as active.

Criterion 2: The device law (2) is lossless if it is passive and if, for any $(F(t),x(t),u(t)) \in B$ and $t_0,t_1 \in R$ $$\int_{t_0}^{t_1} F(t)\dot{x}(t)dt = 0$$

whenever F(t), x(t), u(t) and all derivatives are equal at $t_0$ and $t_1$. The above criterion states that, in addition to being passive, there is zero net energy transfer to or from the device over a time interval whenever the initial and final conditions are identical. Springs and inerters are lossless according to this criterion. The goal is to determine if springs and inerters may be adjustable as well as lossless. In the first instance this question may be addressed in terms of candidate device laws. There is then a further question as to physical realizability. Normal springs and inerters are realizable physically without a power supply, and it is desired to assess if the same is true for any passive or lossless, adjustable device laws.

III. DEVICE LAWS

In this section discussion is made of some candidate device laws for adjustable springs and inerters in general terms, without considering the question of physical realizability. Device laws for adjustable springs. Example 1: (directly adjustable spring constant). Let $$F(t) = k(t)x(t). \quad (4)$$

This is the assumed device law for a "semi-active" ("passive") spring. It is in fact active. Assuming that $k(t_1)=k(t_0)$ and $x(t_1)=x(t_0)$ it is shown that:

$$\mathscr{E} = \int_{t_0}^{t_1} F(t)\dot{x}(t)dt$$

$$= \int_{t_0}^{t_1} k(t)\frac{d}{dt}\left(\frac{1}{2}x^2(t)\right)dt$$

$$= -\frac{1}{2}\int_{t_0}^{t_1} \dot{k}(t)x^2(t)\,dt.$$

A behavior can be constructed for which E is negative. For example, with $t_0=0$, $t_1=4$, x(t)=t for $0 \leq t \leq 2$, x(t)=4−t for $2 \leq t \leq 4$, k(0)=2, k'(t)=−1 for $0 \leq t \leq 1$, k'(t)=1 for $2 \leq t \leq 3$, and k'(t)=0 otherwise, one finds that E=−1. Hence, if such a cycle is continually repeated, an arbitrary amount of energy can be extracted, namely there is no $K \in R$ for which the conditions of Criterion 1 hold. Example 2: (adjustable spring constant with smoothing). Let $$F(t) = k(t)x(t) - \int_{-\infty}^{t} \dot{k}(\tau)x(\tau)d\tau. \quad (5)$$

The above is an idealized device law based on the behavior for a step increase in k(t) (but not a decrease). Differentiating (5) gives F'(t)=k(t)x'(t). Hence, assuming that $k(t_1)=k(t_0)$, $x(t_1)=x(t_0)$ and $F(t_1)=F(t_0)$ it is shown that:

$$\mathcal{E} = \int_{t_0}^{t_1} F(t)\dot{x}(t)dt$$
$$= -\int_{t_0}^{t_1} \dot{F}(t)x(t)dt$$
$$= -\int_{t_0}^{t_1} k(t)\frac{d}{dt}\left(\frac{1}{2}x^2(t)\right)dt$$
$$= \frac{1}{2}\int_{t_0}^{t_1} \dot{k}(t)x^2(t)dt.$$

A behavior can be constructed for which E is negative. For example, with $t_0=0$, $t_1=6$, $x(t)=t$ for $0 \le t \le 3$, $x(t)=6-t$ for $3 \le t \le 6$, $k(0)=2$, $k'(t)=-\frac{1}{2}$ for $0 \le t \le 1$, and $2 \le t \le 3$, $k'(t)=1$ for $4 \le t \le 5$, and $k'(t)=0$ otherwise, it is shown that:

$$\int_{t_0}^{t_1} k(t)\dot{x}(t) = 0$$

which implies $F(t_1)=F(t_0)$. Furthermore $E=-1$. Hence, if such a cycle is continually repeated, an arbitrary amount of energy can be extracted. Hence the conditions of Criterion 1 are not satisfied, and the device law is active. Example 3: (adjustable spring constant with up-smoothing). Let $$F(t) = k(t)x(t) - \int_{-\infty}^{t} \left(\dot{k}(\tau)\right)_+ x(\tau)d\tau. \quad (6)$$

where $$(u(t))_+ = \begin{cases} u(t) & \text{when } u(t) \ge 0 \\ 0 & \text{otherwise} \end{cases}$$

with $(u(t))_-$ specified similarly, so that $u(t)=(u(t))_+ + (u(t))_-$. The above idealized device law is a continuous version of a mechanism for increasing k(t) and corresponds to Example 1 otherwise. Differentiating (6) gives:

$$\dot{F}(t) = k(t)\dot{x}(t) + \left(\dot{k}(t)\right)_- x(t).$$

Hence, assuming that $k(t_1)=k(t_0)$, $x(t_1)=x(t_0)$ and $F(t_1)=F(t_0)$ it is shown that:

$$\mathcal{E} = \int_{t_0}^{t_1} F(t)\dot{x}(t)dt$$
$$= -\int_{t_0}^{t_1} \dot{F}(t)x(t)dt$$
$$= \frac{1}{2}\int_{t_0}^{t_1} \dot{k}(t)x^2(t)dt - \int_{t_0}^{t_1} \left(\dot{k}(t)\right)_- x^2(t)dt$$
$$= \frac{1}{2}\int_{t_0}^{t_1} \left((\dot{k}(t))_+ - (\dot{k}(t))_-\right)x^2(t)dt$$
$$= \frac{1}{2}\int_{t_0}^{t_1} |\dot{k}(t)|x^2(t)dt > 0.$$

Here E is always positive, so energy cannot be extracted over a repeating cycle. This doesn't yet show that the device law is passive, though it is not lossless. Indeed, it fails also to be passive. Let $t_0=0$, $t_1=2n$ for some positive integer n and suppose $k=2$ for $t<0$, $$= 2 + \sin(2\pi t), x(t) = 1, (0 \le t \le n),$$
$$k = 2, x(t) = t + 1 - n, (n \le t \le 2n)$$

From (6) one finds that $F(n)=2-2n$, which means $F(t)=2x(t)-2n$ for $n \le t \le 2n$. Hence $$\int_0^{2n} F(t)\dot{x}(t)dt = 2n - n^2$$

which cannot be bounded below independent of n. Hence Criterion 1 is not satisfied. Example 4: (adjustable spring constant with semi-smoothing). Let $$F(t) = k(t)x(t) - \frac{1}{2}\int_{-\infty}^{t} \dot{k}(\tau)x(\tau)d\tau. \quad (7)$$

From Examples 1 and 2, over any cycle in which $k(t_1)=k(t_0)$, $x(t_1)=x(t_0)$ and $F(t_1)=F(t_0)$ it is shown that:

$$\int_{t_0}^{t_1} F(t)\dot{x}(t)dt = 0.$$

Evidently this law has the potential to be lossless; however, it is now shown that it fails to be so since it is not passive. It is first noted that:

$$\dot{F}(t) = k(t)\dot{x}(t) + \frac{1}{2}\dot{k}(t)x(t).$$

It now follows that:

$$\int_{t_0}^{t_1} F(t)\dot{x}(t)dt = F(t_1)x(t_1) - F(t_0)x(t_0) - \int_{t_0}^{t_1} \dot{F}(t)x(t)dt$$
$$= F(t_1)x(t_1) - F(t_0)x(t_0) - \frac{1}{2}\int_{t_0}^{t_1} \dot{k}(t)x^2(t)dt -$$
$$\int_{t_0}^{t_1} k(t)\frac{d}{dt}\left(\frac{1}{2}x^2(t)\right)dt$$
$$= F(t_1)x(t_1) - \frac{1}{2}k(t_1)x(t_1)^2 -$$
$$-F(t_0)x(t_0) + \frac{1}{2}k(t_0)x(t_0)^2.$$

Let $t_0=0$, $t_1=n+\frac{3}{4}$ for some positive integer n, suppose $k=3$ for $t<0$ and $$k = 2 + \cos(2\pi t), x(t) = \sin(2\pi t), (t > 0).$$

Then $x(t_1)=-1$, $k(t_1)=2$, and from (7)

$$F(t_1) = \frac{(4n+3)\pi}{8} - 2.$$

Hence $$\int_{t_0}^{t_1} F(t)\dot{x}(t)dt = -\frac{(4n+3)\pi}{8} + 1$$

which cannot be bounded below independent of n. Hence Criterion 1 is not satisfied.

Device laws for adjustable inerters. Example 5: (directly adjustable inertance). Let $$F(t) = b(t)\ddot{x}(t). \qquad (8)$$

This is the assumed device law for a "semi-active" inerter. It is again active. Assuming that $b(t_1)=b(t_0)$ and $x'(t_1)=x'(t_0)$ it is shown that:

$$\begin{aligned}\mathscr{E} &= \int_{t_0}^{t_1} F(t)\dot{x}(t)dt \\ &= \int_{t_0}^{t_1} b(t)\frac{d}{dt}\left(\frac{1}{2}\dot{x}^2(t)\right)dt \\ &= -\frac{1}{2}\int_{t_0}^{t_1} \dot{b}(t)\dot{x}^2(t)dt.\end{aligned}$$

A behavior can be constructed for which E is negative, e.g., with b(t) and x'(t) chosen as k(t) and x(t) in Example 1. Such a device could be operated in a repeating cycle which extracts a net amount of energy in each cycle. Hence Criterion 1 is not satisfied. Example 6: (inerter with actively controlled fly-weights). Let $$F(t) = \frac{d}{dt}(b(t)\dot{x}(t)). \qquad (9)$$

Such a device is described as a rack and pinion used to convert linear motion into the rotary motion of two arms with weights which are moved in or out by actuators. It is shown that (9) holds for the device. Hence, assuming that $b(t_1)=b(t_0)$ and $x'(t_1)=x'(t_0)$ it is shown that:

$$\begin{aligned}\mathscr{E} &= \int_{t_0}^{t_1} (t)\dot{x}(t)dt \\ &= -\int_{t_0}^{t_1} b(t)\frac{d}{dt}\left(\frac{1}{2}\dot{x}^2(t)\right)dt \\ &= \frac{1}{2}\int_{t_0}^{t_1} \dot{b}(t)\dot{x}^2(t)dt.\end{aligned}$$

Again E can be negative, e.g., with b(t) and x'(t) chosen as k(t) and x(t) in Example 2. Hence Criterion 1 is not satisfied, so the device law is active.

IV. PLANAR MECHANISM FOR LOSSLESS ADJUSTABLE DEVICES

Figure 2:
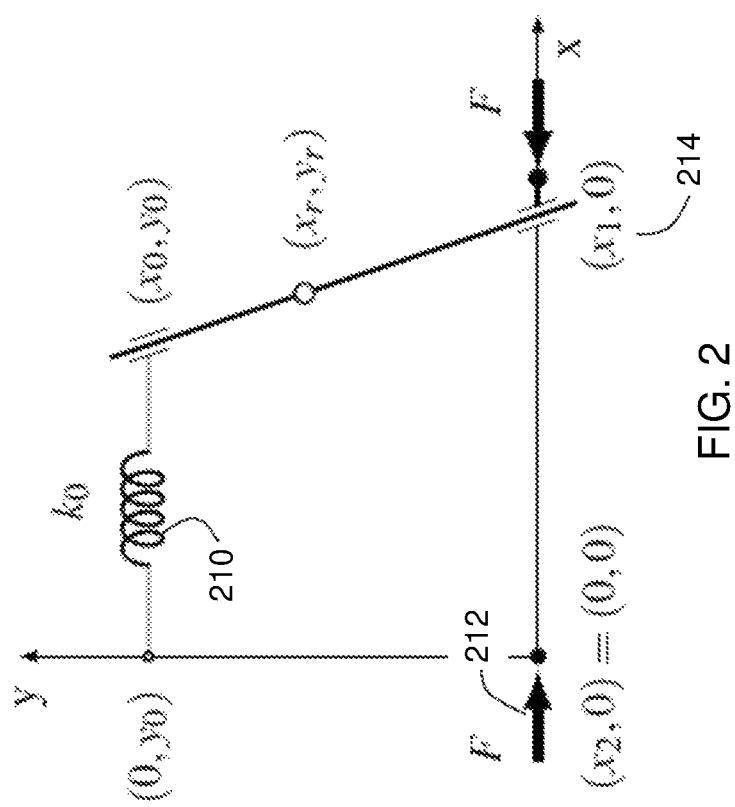
FIG. 2 illustrates an exemplary spring and lever with moveable fulcrum at $(x_r, y_r)$.

FIG. 2 illustrates an exemplary spring and lever with moveable fulcrum at (xr,yr). Lossless adjustable spring. Consideration is made of a mechanism 200 as depicted in FIG. 2 in which the x- and y-axes are fixed in a device housing. The device terminals 212 and 214 are respectively located at (0,0) and ($x_1$,0) according to the convention of FIG. 1 and accordingly specification is made that $x=-x_1$ and $v=-x_1'$. An internal spring 210 with stiffness $k_0$ is constrained to move parallel to the x-axis with fixed y-coordinate $y_0$ and generates a force equal to $-k_0x_0$. An ideal massless lever has a moveable fulcrum at ($x_r$,$y_r$). Taking moments about the fulcrum gives:

$$Fy_r = k_0x_0(y_0 - y_r).$$

The geometrical position of the lever imposes the following constraint:

$$\frac{x_0 - x_1}{y_0} = \frac{x_r - x_1}{y_r}$$

$$x_0 = rx + (r+1)x_r \qquad (10)$$

where $$r = (y_0 - y_r)/y_r. \qquad (11)$$

One therefore obtains:

$$F = k_0r^2x + k_0r(r+1)x_r. \qquad (12)$$

Consideration is next made that the fulcrum is moveable with an imposed condition that the instantaneous power supplied at the external terminals of the device equals the rate of change of the internal energy of the spring. This is corresponding to $Fx'=kx_0x_0'$, which on noting that $F=k_0x_0r$ is in turn corresponding to $rx'=x_0'$. The latter, using (10), is corresponding to:

$$(r+1)\dot{x}_r + \dot{r}(x + x_r) = 0. \qquad (13)$$

By setting $k_0=1$ (or absorbing $k_0$ into r) and making the substitution $w=(r+1)x_r$, (12) and (13) can be reduced to the form:

$$F = r^2x + rw, \qquad (14)$$

$$\dot{w} = -\dot{r}x. \qquad (15)$$

Equations (14), (15) can be written in an integral form as a single equation with the substitution $k(t)=r(t)^2$:

$$F(t) = k(t)x(t) - \frac{1}{2}k(t)^{1/2}\int_{-\infty}^{t} k(\tau)^{-1/2}\dot{k}(\tau)x(\tau)d\tau. \qquad (16)$$

It noted the close similarity with the device law (7) of Example 4. Further from (14), (15) specification is made that:

$$\mathscr{E} = \frac{1}{2}(xr+w)^2 = \frac{1}{2}\frac{F^2}{r^2}.$$

$$\frac{d}{dt}(\mathscr{E}) = (xr+w)(\dot{x}r+x\dot{r}+\dot{w})$$

$$= (xr+w)\dot{x}r = F\dot{x}.$$

Hence $\mathscr{E}$ can be considered to be the internal stored energy of the device law (14)-(15) and it follows that the device law is lossless according to Criterion 2. Note that we may take $K=\mathscr{E}(t_0)$ to show passivity according to Criterion 1.

Figure 3:
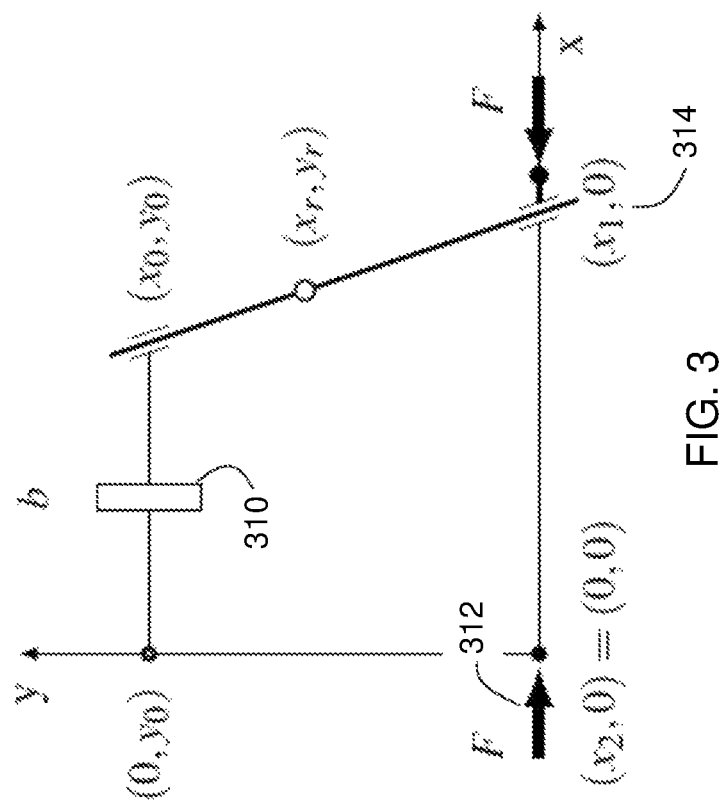
FIG. 3 illustrates an exemplary inerter and lever with moveable fulcrum at $(x_r, y_r)$.

FIG. 3 illustrates an exemplary inerter and lever with moveable fulcrum at $(x_r, y_r)$. Lossless adjustable inerter. Consideration is made of the mechanism 300 as depicted in FIG. 3 which is similar to the device in FIG. 2 except that the spring 210 is replaced by an inerter 310 which generates a force equal to $-bx0''$. Taking moments about the fulcrum gives $F=bx_0''r$ with r specified as in (11) and $x_0$ as in (10). Applying again the condition that the instantaneous power supplied at the external terminals 312 and 314 of the device equals the rate of change of the internal energy of the inerter gives again (13) or correspondingly $x_0'=rx'$. Absorbing b into r one obtains the following form for the device law:

$$F = r\frac{d}{dt}(r\dot{x}). \quad (17)$$

It is seen that $$F\dot{x} = \frac{d}{dt}(\mathscr{I})$$

where one may specify the internal stored energy by:

$$\mathscr{I} = \frac{1}{2}r^2\dot{x}^2.$$

Hence the device law (17) is lossless according to Criterion 2. Dual canonical form for the lossless adjustable spring. The device law (17) in the inerter case is in striking contrast to (14-15) for the spring. It is next shown that (14-15) can be rewritten in a dual form to (17). Differentiating (14) and making use of (15) it is shown that:

$$\dot{F} = 2r\dot{r}x + r^2\dot{x} + r\dot{w} + \dot{r}w$$

$$= r^2\dot{x} + \frac{\dot{r}}{r}F.$$

Writing $p=r^{-1}$ it is deduced that:

$$\dot{x} = p\frac{d}{dt}(pF). \quad (18)$$

Again it is seen that $$F\dot{x} = \frac{d}{dt}(\mathscr{I})$$

where one may specify the internal stored energy by:

$$\mathscr{I} = \frac{1}{2}p^2 F^2.$$

Hence the exemplary device law (18) is lossless according to Criterion 2.

V. CANONICAL DEVICE LAWS

The exemplary device laws (17) and (18) are lossless according to Criterion 2. Consideration is next made as to how they may be realized physically without an internal power source. Physical implementation. For FIG. 2 or FIG. 3 the condition that the instantaneous power supplied at the external terminals of the device equals the rate of change of the internal energy of the spring or inerter reduces to the same equation (13). This determines the manner in which the fulcrum should be moved when the ratio r is changed. This condition is examined further. Eliminating r using (11) then (13) reduces to:

$$0 = y_r\dot{x}_r - \dot{y}_r(x_r - x_1)$$

which means geometrically that the vectors $$\begin{pmatrix} \dot{x}_r \\ \dot{y}_r \end{pmatrix} \text{ and } \begin{pmatrix} x_r - x_1 \\ y_r \end{pmatrix}$$

are parallel. The fulcrum always moves parallel to the bar.

Figure 4:
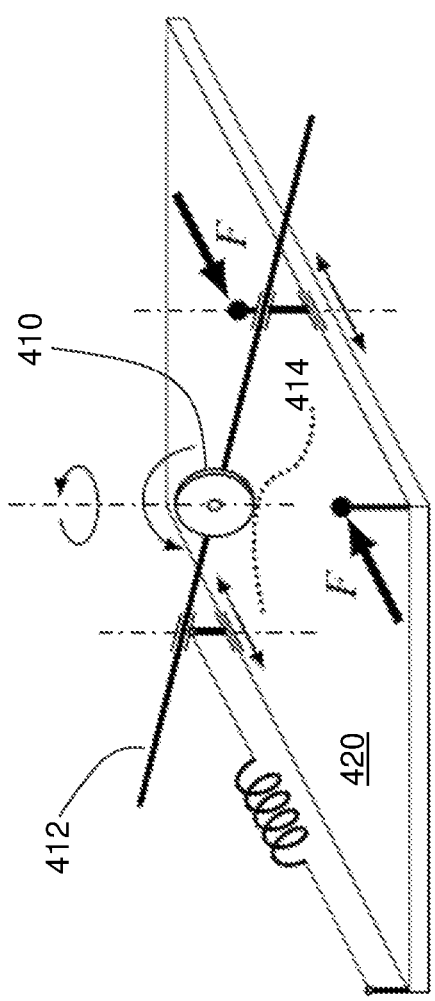
FIG. 4 illustrates an exemplary lever mechanism with moveable fulcrum to allow a physical realization of lossless adjustable springs and inerters.

FIG. 4 illustrates an exemplary lever mechanism 400 with moveable fulcrum to allow a physical realization of lossless adjustable springs and inerters. A conceptual scheme to realize such adjustability is shown in FIG. 4. A wheel 410 is attached to a bar 412 at a fulcrum 414 and is free to rotate about a vertical axis through the fulcrum and the contact point of the wheel on a supporting table 420. The wheel 410 is allowed to rotate about a horizontal axis which is perpendicular to the bar 412 to produce a rolling motion on the table 420 which is always instantaneously parallel to the bar 412. The rolling of the wheel 410 is the method of mechanism adjustment by altering the ratio r or $p=r^{-1}$ with r specified as in (11).

The varspring and varinerter. Introduction is made of a pair of ideal, lossless adjustable mechanical one-ports which are named the varspring and varinerter. The ideal devices are specified by the laws:

$$v = p\frac{d}{dt}(pF) \quad \text{(varspring)} \quad (19)$$

$$F = r\frac{d}{dt}(rv) \quad \text{(varinerter)} \quad (20)$$

where (F,v) is the force-velocity pair of the mechanical one-port and p(t), r(t) are positive and freely adjustable parameters. The internal energy of the devices is given by $(½)p^2F^2$ and $(½)r^2v^2$ respectively. As in the case of the ideal inerter consideration is made that physical devices may be constructed which approximate the ideal behavior, have two terminals which are freely and independently moveable, have a sufficiently small mass and sufficient travel, and do not need to have a physical attachment to a fixed point in space. The construction of FIG. 4 indicates that devices satisfying these conditions are physically realizable in principle. The varinerter is realized as in FIG. 4 with an inerter replacing the spring.

It is noted that the device laws (19) and (20) may be written in integral form as follows:

$$F(t) = \hat{r}(t) \int_{-\infty}^{t} \hat{r}(\tau) v(\tau) d\tau \quad \text{(varspring)} \tag{21}$$

$$v(t) = \hat{p}(t) \int_{-\infty}^{t} \hat{p}(\tau) F(\tau) d\tau \quad \text{(varinerter)} \tag{22}$$

where
$$\hat{r} = p^{-1}$$
and
$$\hat{p} = r^{-1}.$$

Note also that (21) reduces to (16) with the substitution $$k(t) = \hat{r}(t)^2$$

and integration by parts.

VI. ROTARY MECHANICAL ONE-PORTS

In this section exploration is made of the rotary variants of the varspring and varinerter. Consideration is first made of an adjustable rotary transformer.

A lossless adjustable transformer. Consideration is made of the construction 500A depicted in FIG. 5A including two right circular cones 510A and 512A of equal aperture on parallel rotating shafts 520A and 522A, with opposite orientation, and hence a constant perpendicular distance between the surfaces. Between the cones 510A and 512A is an assembly 530A including two balls 532A and 534A within a housing 536A which is moveable parallel to the surface of the cones 510A and 512A to maintain contact of the balls 532A and 534A with the cones 510A and 512A at the feet of the perpendicular between the cones 510A and 512A. It is assumed that pure rolling is maintained between the balls 532A and 534A and the cones 510A and 512A, and between themselves, and that there is frictionless sliding between the balls 532A and 534A and the housing 536A. With the assumption of negligible mass of the whole system the torques on the two shafts 520A and 522A are proportional, with the proportionality being the instantaneous ratio of cone radii. The assumption of pure rolling yields that the angular velocities are similarly proportional. Thus laws of the form may be presumed:

$$T_1 = pT, \tag{23}$$

$$\omega_1 = -p^{-1}\omega \tag{24}$$

where $T$, $T_1$ are the torques on the shafts, $\omega$, $\omega_1$ are their angular velocities, and $p=p(t)>0$ is the instantaneous ratio of cone radii. It is noted that $T_1\omega_1 + T\omega = 0$ so that no energy is absorbed or dissipated in the ideal device. Hence one may consider the schematic of FIG. 5A as a physical realization of a lossless adjustable rotary transformer.

Figure 5A:
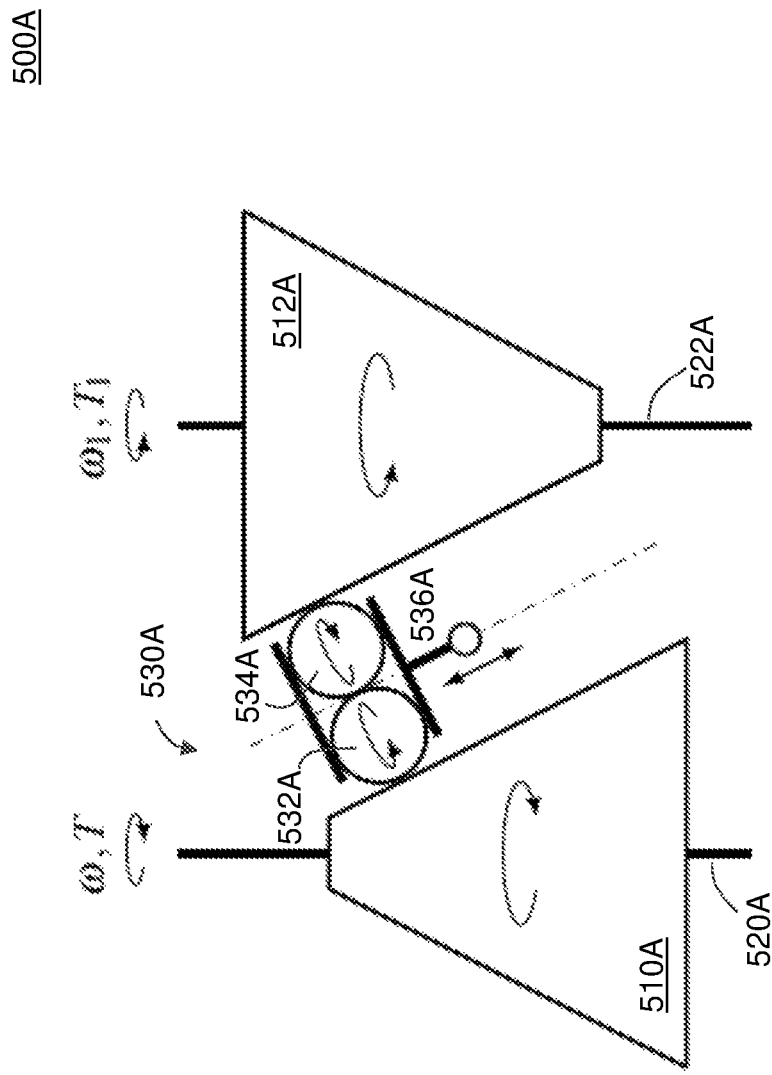
FIG. 5A illustrates an exemplary adjustable rotary transformer with counter-rotating cones and continuously moveable connecting assembly.

FIG. 5A illustrates an exemplary adjustable rotary transformer with counter-rotating cones 510 and 520 and continuously moveable connecting assembly. The rotary varspring and varinerter. First, consideration is made of attaching a rotary spring of rotational stiffness k>0 (constant) to the second shaft in FIG. 5A specified by $T_1 = -k\theta_1$ where $\theta_1' = \omega_1$. A passive (lossless) rotary mechanical one-port is formed with the following relationship between the equal and opposite torque applied to the external (rotary) terminals T and the relative angular velocity $\omega$ between the terminals:

$$\omega = -p\omega_1 = pk^{-1}\frac{d}{dt}(pT).$$

Similarly, if a rotary inerter with rotational inertance b>0, specified by $T_1 = -b\omega_1'$, is connected across the second shaft in FIG. 5 a passive (lossless) rotary one-port is formed satisfying:

$$T = -br\dot{\omega}_1 = br\frac{d}{dt}(r\omega).$$

The constants k and b can be absorbed into p and r respectively. This motivates the following specifications of the rotary varspring and varinerter:

$$\omega = p\frac{d}{dt}(pT) \quad \text{(rotary varspring)} \tag{25}$$

$$T = r\frac{d}{dt}(r\omega) \quad \text{(rotary varinerter)} \tag{26}$$

where (T,$\omega$) is the torque-angular-velocity pair of the mechanical one-port and p(t), r(t) are positive and freely adjustable parameters. The internal energy of the devices is given by $(½)p^2T^2$ and $(½)r^2\omega^2$ respectively.

Figure 5B:
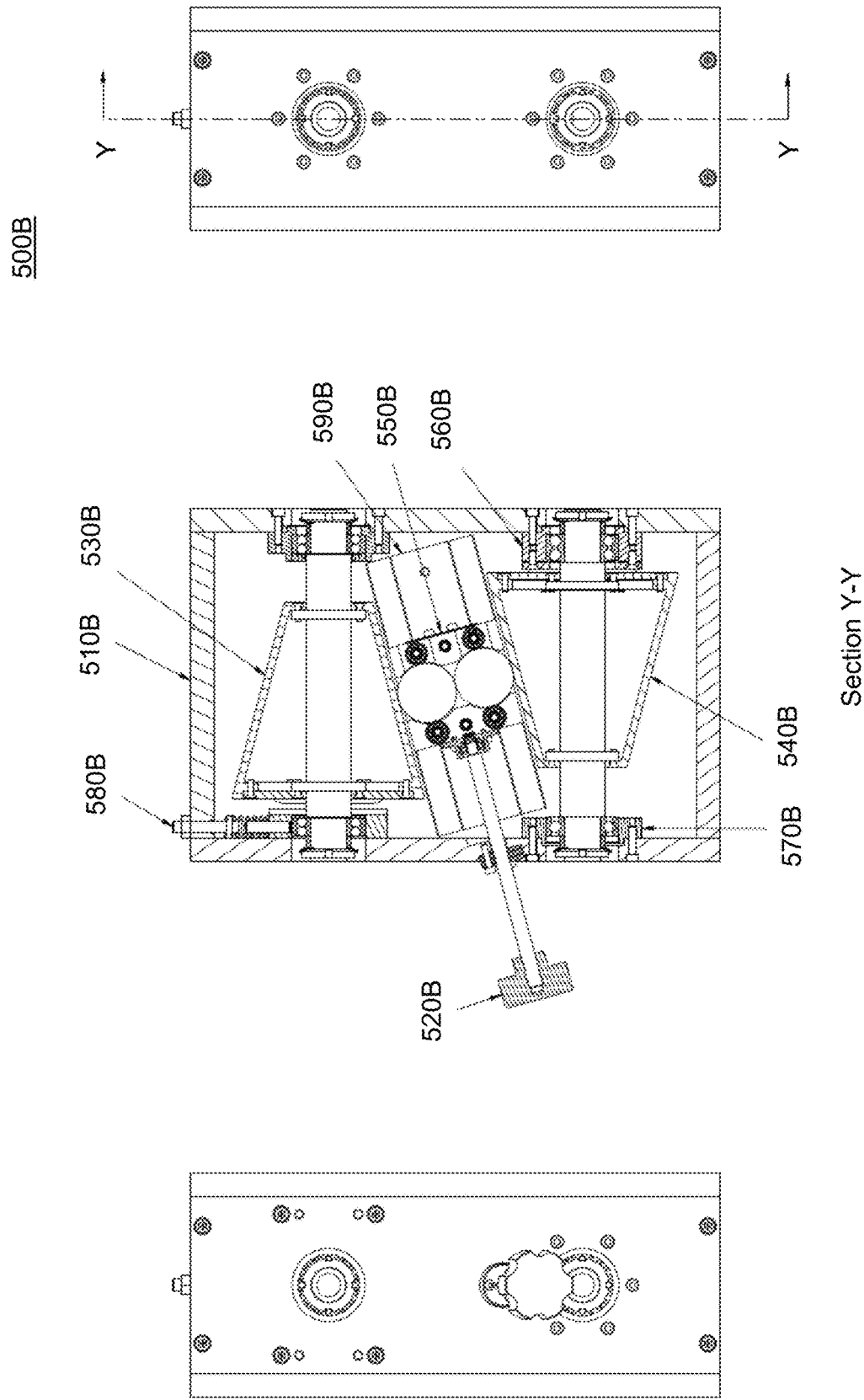
FIG. 5B illustrates an exemplary adjustable rotary transformer according to an embodiment.

FIG. 5B illustrates an embodiment of a lossless adjustable transformer. Example designs of an adjustable transformer. The device is housed is in an enclosure (510B) with two parallel rotating shafts to which are mounted a pair of cones (530B and 540B) connected by a moveable carriage assembly (550B) including a pair of spherical balls (or ball bearings) to transmit a drive between the cones. In this embodiment, the cones are shown as hollow components which assemble to the central rotating shafts in order to reduce their moving masses; however, the use of solid cones is also contemplated. An upper cone assembly (including the cone (530B)) is connected to an upper shaft which acts as one external (rotary) terminal of the device, and the other (rotary) terminal being a coaxial fixed attachment to the enclosure (not shown). This pair of terminals serves as connection points of the device to other devices or components in a mechanical network. The rotary drive of the upper shaft is transferred to an upper ball of the moveable carriage assembly, which is caused to rotate about an axis parallel to carriage bearing rails (590B). In turn, this upper ball causes a lower ball of the moveable carriage assembly to rotate around a similar axis parallel to the carriage bearing rails. The lower ball of the moveable carriage assembly then imposes a rotation upon a lower cone assembly (including the cone (540B)) in the illustrated embodiment. Finally, the drive can be transferred from the lower cone assembly to an external component. In the case of a lossless adjustable spring, this external component can be a torsional spring or similar rotary spring device. In the case of a lossless adjustable inerter, this external driven component can be a flywheel or rotary inerter. Alternatively, a combination of inertial, damping, and/or spring components can be connected to the driven shaft of this device. The device can also be considered as a stand-alone lossless adjustable rotary transformer which may have other applications for which a continuously variable transmission (CVT) is specified.

Externally, the device includes two separate adjustments which can be manually set or can be remotely adjusted by an electrical controller using electro-mechanical actuators or other similar devices. The first of these adjustments is a gear ratio adjustment, which is illustrated by component (520B). By rotating an adjustment knob, a leadscrew is rotated which causes a linear displacement of the moveable carriage assembly (550B) along its guiding bearing rails (590B). Other linear actuation mechanisms can also be used to control a position of the moveable carriage assembly, such as linear slide adjustments, rack and pinions, ball-screw devices, and so forth. As the moveable carriage assembly translates along its bearing rails, positions of the balls change with respect to the cone assemblies; however, it is noted that the direction of the translation of the moveable carriage assembly is maintained parallel to contacting surfaces of the cones, such that the spacing of the cones will not change with the displacement of the moveable carriage assembly. The gear ratio of the device is varied by the translation of the carriage assembly with its balls. By changing the position of the carriage assembly, points of contact between the balls and the cones is changed which in turn changes the driving contact radius and driven contact radius, thus the gear ratio is changed. The gear ratio can be expressed as driving cone contact radius divided by the driven cone contact radius. In the adjustment of the moveable carriage assembly, the balls rotate with an axis of rotation which is orthogonal to their normal rotation in transmitting torque through the device. The embodiment of the device permits these two rotational degrees of freedom for each ball with negligible resistance to motion, details for which are discussed further below.

The second external adjustment of the device (illustrated by component (580B)) is a screw adjuster to control a spring preload placed upon the upper driving cone assembly (530B). In order to transmit torque through the device it is desired for there to be positive reaction forces between the interconnecting components, namely the pair of cones and the pair of balls. The lower cone assembly (540B) is essentially fixed with one degree of freedom which is a rotation about its central axis. This is achieved by a pair of angular contact bearings at a right hand side of the driven cone (560B), and a deep groove bearing at a left hand side of the driven cone (570B). Other bearings combinations are also contemplated—but one of the cone assemblies should have one degree of freedom to rotate upon its central axis.

The balls are held within the carriage assembly without linear degrees of freedom, and three rotational degrees of freedom each. The upper cone assembly is preloaded with a spring force to maintain all of the reaction forces positive. In the illustrated embodiment, a pivoting motion is placed upon the upper driving cone assembly (530B). A pair of spherical contact bearings are used, with a right hand side bearing held in a fixed location. The upper shaft can then rotate slightly about the right hand side bearing. A left hand side bearing is retained in a moving housing which is guided to move in a vertical (up/down) direction in FIG. 5B. The left hand side bearing is also free to slide axially in its housing. The adjustment mechanism (580B) then applies a substantial spring preload force downwards upon the left hand side bearing housing, and in turn upon the driven cone. The upper cone assembly does not rotate in practice because its position is fixed by the lower cone assembly and the pair of balls. However, the spring preload does impose the requisite positive reaction forces between the components such that torque can effectively be transmitted through the components. Other preload mechanisms are also contemplated. One such design can impose a pure linear vertical translation of the entire upper cone assembly, or a linear translation that is orthogonal to the contacting surface of the upper cone.

Figure 5C:
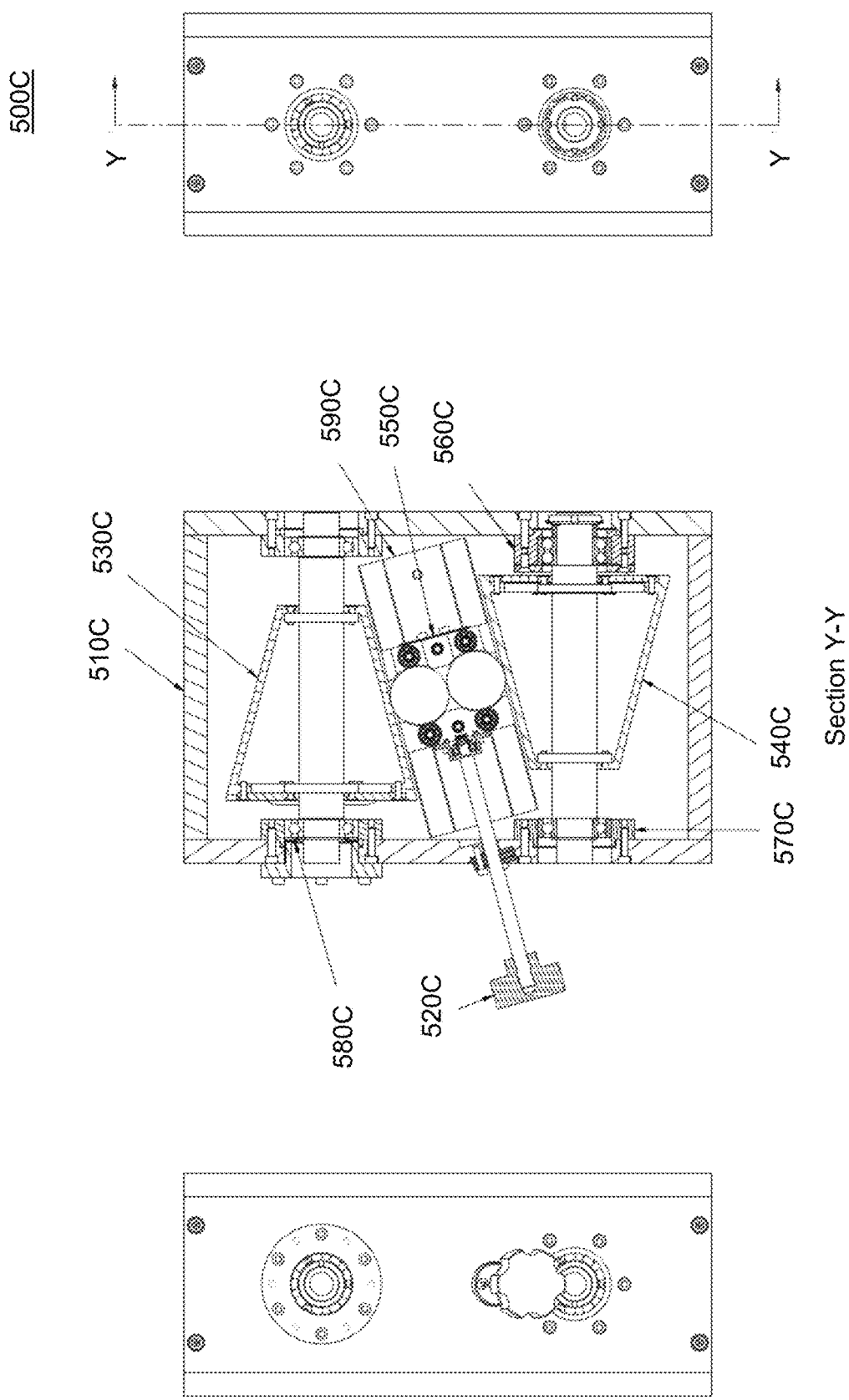
FIG. 5C illustrates an exemplary adjustable rotary transformer according to another embodiment.

FIG. 5C illustrates an exemplary adjustable rotary transformer according to another embodiment. Alternatively, as illustrated for another embodiment in FIG. 5C, it is possible to impose a linear axial force to the upper cone assembly—parallel to its central axis. This would include two deep groove radial bearings to hold the upper shaft in place, and an axial spring device to cause a linear force to be exerted upon the entire upper shaft such that the cones and balls are held in rigid contact. The entire upper cone assembly floats axially in the bearing housings, which is achieved by ensuring there is adequate clearance in the bearing housings for the outer bearing diameter. A Smalley nested wave washer spring is used to impose an axial force on the outer bearing on the left hand side. This is shown by component (580C) in FIG. 5C. This wave washer spring is a component used to preload bearing assemblies with an axial force. An external clamp ring supplies a compression on this wave washer spring—which amounts to about 2 mm. Hence there is an imposed axial force on the upper cone which generates a reaction force between the balls and lower cone. In this embodiment, an axial force of about 500 N is imposed, which is more than adequate to develop an acceptable reaction force between the cones. Due to the shallow contact angle of the cone, a moderate axial preload force generates a high reaction force between the cones and the balls. The force can be changed by either inserting packing shims or machining away a spigot which presses against the wave washer spring. Other spring mechanisms can also be used, such as disc springs (Belleville washers), or compression (coil) springs. This particular axial force implementation does have some advantages, in being streamlined to implement, and without risk of affecting the angular alignment of the cone assemblies. Although the above description refers to the use of rolling contact ball bearings to support the shafts, in order to reduce the torsional friction or resistance to motion, also contemplated is to mount bearing shaft/cone assemblies in plain bearings, or hydrodynamic bearings.

The illustrated embodiments show a fully enclosed device but the described device can be incorporated in other mechanical equipment such as gearboxes or clutch assemblies. The device can be operated dry or can be lubricated with an internal or external oil supply or other lubricant. Alternatively, a suitable grease can be applied to the internal components of the device. A criterion of a lubrication system for the device is that the mechanical components are effectively protected from wear/damage but the effective coefficient of friction at the mechanical contacts is maximized such that the transmitted torque is optimized. Various lubricants are suitable. Oil seals can be used at the position of each shaft/adjustment exit from the enclosure to ensure that any internally contained lubricant is retained in the device without the presence of oil leaks.

Figure 5D:
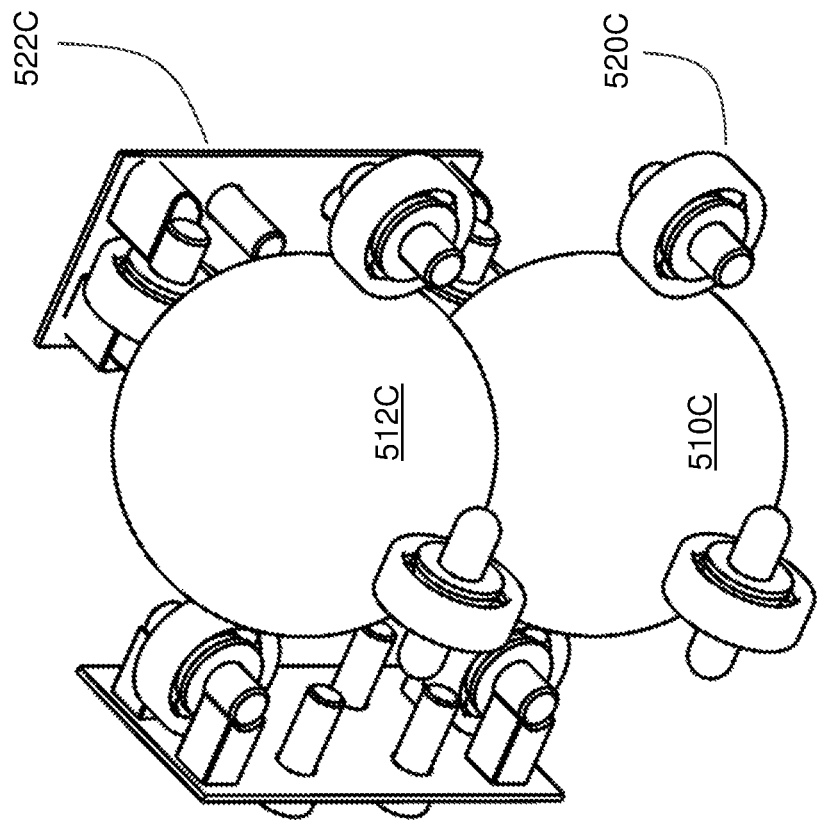
FIG. 5D illustrates an exemplary moveable carriage assembly included in the exemplary adjustable rotary transformer of FIG. 5B and FIG. 5C.

FIG. 5D illustrates an exemplary moveable carriage assembly included in the exemplary adjustable rotary transformer of FIG. 5B and FIG. 5C.

A consideration in the design of the device is accurately maintaining a geometry of the cone assemblies. The cone assembly shafts should be parallel to one another, and centers of the balls should be constrained to be located on a common line which intersects the upper ball/cone contact point and the lower ball/cone contact point. The maintenance of this geometry is an unstable mechanical system, in which the requisite preload forces upon the balls rapidly increase in relation to the ball positioning errors. To consider the accurate control of the ball positions, the theory of kinematic constraint is applied whereby each successive point of constraint contact will remove one degree of freedom from the component—if the constraint contacts are effectively applied. FIG. 5D illustrates the internal components of the moveable carriage assembly. As previously stated, the lower driven cone assembly is fixed with one rotational degree of freedom about its central axis. The lower cone (not shown here) will place a constraint contact upon the lower ball 510C in FIG. 5D. This contact will be at the base of the lower ball 510 C in the diagram. The lower ball 510C is then held in place by further two constraint contacts 520C provided by rolling ball bearings on shafts with axes as illustrated at the front of the lower ball 510C. The lower ball 510C thereby has three orthogonal constraint contacts which remove the three linear degrees of freedom from the lower ball 510C, and permitting just three degrees of rotational freedom about three orthogonal axes. Shown at the rear of the ball 510C are two further rolling ball bearings placed about 90 degrees apart. These bearings do no contribute directly to the ball constraint system but are preload bearings which maintain positive reaction forces at each constraint contact. In the illustrated embodiment there are vertical leaf spring plates 522C but other spring preload devices are also contemplated. The leaf spring design provides a compact mechanical arrangement with high spring rates being possible.

By virtue of the lower cone assembly, and the two orthogonal constraint bearings, the lower ball 510C is thus held in a controlled position. Although there are three degrees of rotational freedom for the lower ball 510C, the degree of rotational freedom with a vertical axis is not used in this design. During the transmission of torque, the constraint bearing in the lower left hand side of FIG. 5D will rotate, together with the opposing preload bearing. It should be noticed that the axis of rotation passes through the point of contact of the orthogonal constraint bearing 520C, at the lower right side of FIG. 5D, and also through the point of contact with its opposing preload bearing on the opposite side of the ball. There will thus be effectively no resistance to this rotational motion. This is because, the first constraint bearing 520C and its preload bearing rotate freely about their central shafts. The orthogonal bearings have contact points on the axis of rotation, and therefore the resistance to motion is effectively force multiplied by the coefficient of friction, in turn multiplied by the radius of the contact, which in this case is negligible. Hence, the total resistance to rotation of the ball 510C is effectively zero even though there is some sliding contact. Conversely, during the linear adjustment of the moving ball carriage, the opposite situation occurs, but still there is negligible resistance to motion, as again the sliding contacts rotate with points of contact which are contained at, or very close to the axis of rotation. It should also be mentioned that other mechanisms of constraining the balls in position are contemplated. These mechanisms can include the support of large balls on nests of recirculating smaller balls, the use of spherically shaped plain sliding bearings, or the use of fluid film bearings (either air or oil) to support the balls in position.

As described above, the lower ball 510C is held in a fixed position in space with three rotational degrees of freedom. This lower ball in turn provides the lower constraint contact for the upper ball. As before, further two orthogonal constraint contacts are provided by rolling bearings at the front of the upper ball. Therefore, the upper ball 512C also has three degrees of rotational freedom, and it can also transmit torque, or permit linear adjustment motion of the moveable carriage assembly, with negligible resistance to motion. In turn this upper ball 512C provides a fixed constraint contact for the upper cone assembly. The upper cone assembly will then have two possible degrees of freedom, either linear or rotary depending upon the spring preload to be applied, and a rotational degree of freedom about its central axis. The upper ball 512C of the moveable carriage assembly therefore provides the additional constraint contact for the upper cone assembly. Thereby the position of the upper cone assembly is preloaded into a stable position with one degree of freedom which is rotation about its central axis. Hence, consideration is made of the various components in the design, and established, in this embodiment, the manner in which the positions of the components are adequately controlled to permit the degrees of rotational freedom for the design to operate effectively. It is also contemplated to hold the upper driving cone assembly as fixed and to preload the lower driven cone assembly—which is the reverse to the situation in the described embodiment.

Figure 5E:
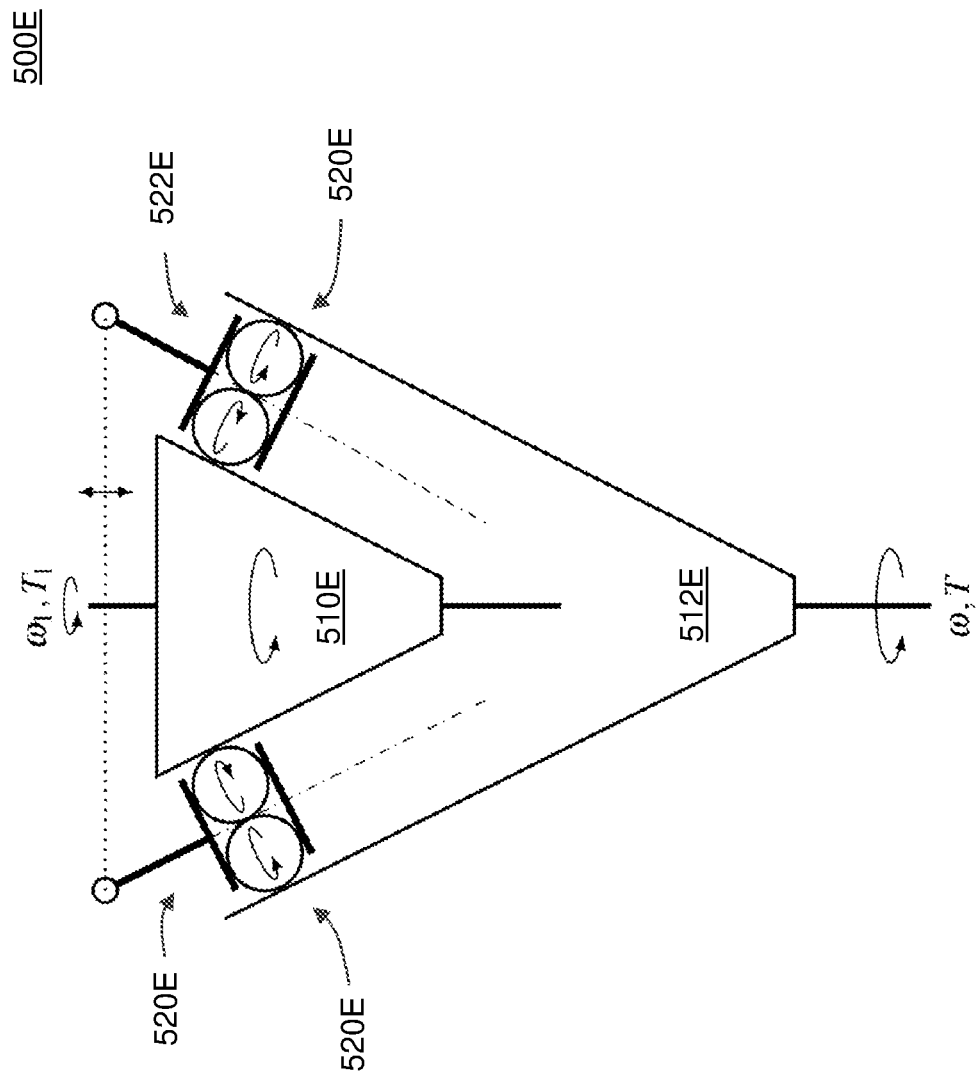
FIG. 5E illustrates an exemplary adjustable rotary transformer according to a further embodiment.

FIG. 5E illustrates an exemplary adjustable rotary transformer according to a further embodiment.

FIG. 5E illustrates a further embodiment of an adjustable rotary transformer. The device 500E includes rotating inner 510E and outer 512E cones and continuously moveable carriage assemblies 520E and 530E. This design allows for multiple pairs of counter-rotating balls (or ball bearings) 522E and 532E within the device. Specifically, the outer cone 512E is hollow. The pairs of counter-rotating balls 522E and 532E, within respective carriage assemblies 520E and 530E that are oppositely arranged, make contact at a same depth within the hollow outer cone 512E and transfer forces simultaneously and at a same ratio of angular velocities between the inner cone 510E and the outer cone 512E. More generally, at least one carriage assembly can be included, such as one, or two oppositely arranged carriage assemblies 520E and 530E as illustrated in FIG. 5E, or three or more equally spaced carriage assemblies.

VII. ADJUSTABLE ELECTRICAL DEVICES

Attention turns to adjustable electrical devices. The variable resistor with device law $v(t)=R(t)i(t)$, where $v(t)$ is the voltage across the device, $i(t)$ the current through, and $R(t)>0$ the variable resistance, is a device that is formally passive in the same way as the adjustable damper. For the capacitor and inductor there are analogous issues to the mechanical case in constructing devices which are passive, lossless, as well as adjustable. Consideration begins with some examples that highlight how varying capacitance or inductance, directly, leads to active elements.

Figure 6:
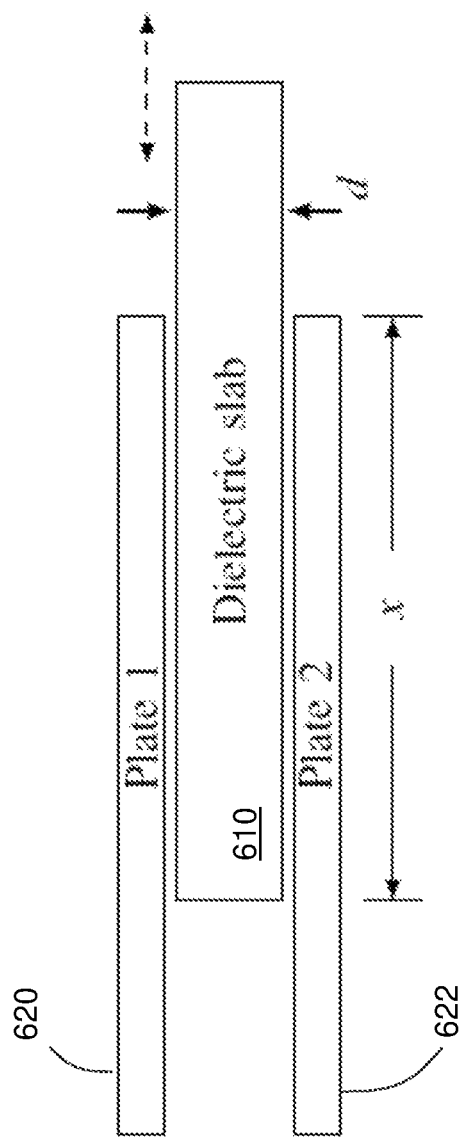
FIG. 6 illustrates an exemplary parallel-plate capacitor with a moveable dielectric slab.

FIG. 6 illustrates an exemplary parallel-plate capacitor with a moveable dielectric slab. Example 7: (adjustable parallel-plate capacitor). Consideration is made of a parallel-plate capacitor 600 with a dielectric slab 610 which can be inserted by varying amounts between the plates 620 and 622 as shown in FIG. 6. The equation for the capacitance is $C(t):=q(t)/v(t)$, where q is the charge on the plates 620 and 622 and v is the voltage between them, from which it follows that:

$$i(t) = \frac{d}{dt}(C(t)v(t)). \tag{27}$$

It is shown that:

$$C = \frac{\varepsilon_0 b}{d}(\kappa x + a - x)$$

where $\varepsilon_0$ is the permittivity of empty space and $\kappa$ is the dielectric constant of the dielectric; it is assumed that the plates are rectangular of length a and width b, are at a distance d apart, and the dielectric is inserted by a distance $x=x(t)$.

Now consider a time interval $[t_0,t_1]$ in which $C(t_0)=C(t_1)$ and $v(t_0)=v(t_1)$. Then the energy supplied to the device $$\mathscr{E} = \int_{t_0}^{t_1} i(t)v(t)dt = \int_{t_0}^{t_1} v(t)\frac{d(C(t)v(t))}{dt}dt$$
$$= -\int_{t_0}^{t_1} C(t)v(t)\dot{v}(t)dt$$
$$= \frac{1}{2}\int_{t_0}^{t_1} \dot{C}(t)v^2(t)dt.$$

As before E can be negative, e.g., with C(t) and v(t) chosen as k(t) and x(t) in Example 2. Hence Criterion 1 is not satisfied, so the device law is active, since a force is involved to move the dielectric slab. A similar conclusion holds if the distance d between the plates is varied.

Figure 7:
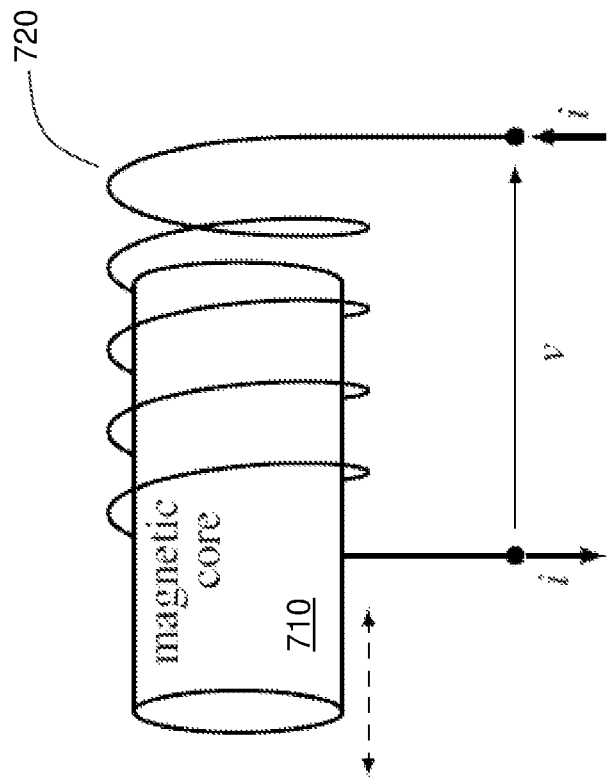
FIG. 7 illustrates an exemplary variable inductor with moveable magnetic core.

FIG. 7 illustrates an exemplary variable inductor with moveable magnetic core. Example 8: (adjustable inductor with moveable core). Likewise, the device law $$v(t) = \frac{d}{dt}(L(t)i(t)) \tag{28}$$

is the ideal law of a device whose inductance $L(t):=\Phi(t)/i(t)$ varies with time; here $\Phi$ is the magnetic flux through the coils, i the current through, and v the voltage across the terminals. Such a variable inductor can be constructed with a moveable ferrite magnetic core 710 as depicted in FIG. 7, which is slid in or out of the coil 720 in order to adjust the permeability and hence the magnetic flux. Again consider a time interval $[t_0,t_1]$ in which $L(t_0)=L(t_1)$ and $i(t_0)=i(t_1)$. Then the energy supplied to the device $$\mathscr{E} = \int_{t_0}^{t_1} i(t)v(t)dt = \int_{t_0}^{t_1} v(t)\frac{d(L(t)i(t))}{dt}dt$$
$$= -\int_{t_0}^{t_1} L(t)i(t)\frac{d}{dt}(i(t))dt$$
$$= \frac{1}{2}\int_{t_0}^{t_1} \dot{L}(t)i^2(t)dt.$$

Again E can be negative, e.g., with L(t) and i(t) chosen as k(t) and x(t) in Example 2. Hence Criterion 1 is not satisfied, so the device law is active.

FIG. 8 illustrates an exemplary electrical autotransformer 800. Electrical adjustable transformer. In analogy with the mechanical case, lossless adjustable capacitors and inductors would be realizable if a lossless adjustable ideal transformer can be constructed. The following governing equations can be envisaged:

$$v_2(t) = m(t)v_1(t) \tag{29a}$$

$$i_2(t) = -m^{-1}(t)i_1(t) \tag{29b}$$

where $(v_k, i_k)$ are the voltage-current pairs for the two ports and m(t) is an adjustable ratio. It is noted that $v_1(t)i_1(t)+v_2(t)i_2(t)=0$, so the device would be "instantaneously lossless", and indeed such a device law satisfies the generalization of Criterion 2 (losslessness) to multi-ports. It is observed that a lossless adjustable capacitor (inductor) would result by terminating one of the ports of the transformer (29a)-(29b) with a capacitor (inductor). For example, if the second port is terminated with a unit capacitor, which means that $i_2=-v_2'$, then it is found that:

$$i_1(t) = m(t)\frac{d}{dt}(m(t)v_1(t)) \tag{30}$$

which is analogous to the varinerter in the force-current analogy between mechanical and electrical devices. Accordingly discussion is made of realizing such an ideal adjustable transformer (29a)-(29b). It is noted that the (ordinary) ideal electrical transformer is derived as a limit of a pair of coupled coils with perfect coupling as the inductance becomes very large. This is a logical place to begin. The law specifying the electrical response of a pair of coupled coils is $$\begin{pmatrix} v_1 \\ v_2 \end{pmatrix} = \frac{d}{dt}\left(\begin{pmatrix} L_1 & M \\ M & L_2 \end{pmatrix}\begin{pmatrix} i_1 \\ i_2 \end{pmatrix}\right). \tag{31}$$

where $L_k$ are the self-inductances and M is the mutual inductance. In the case of perfect coupling (e.g., coils where all magnetic field lines engage both coils) one obtains $L_1L_2-M^2=0$ and, therefore, the inductance matrix is singular. Consideration is made of this ideal case where it is set $$\begin{pmatrix} L_1 & M \\ M & L_2 \end{pmatrix} := \begin{pmatrix} L & m(t)L \\ m(t)L & m(t)^2L \end{pmatrix}, \tag{32}$$

namely the self inductance of the first coil $L_1=L$ is assumed to be constant, the mutual inductance is $M(t)=m(t)L$, where $m(t)$ represents a time varying adjustable coupling parameter, and the self inductance of the second coil is $L_2(t)=m(t)^2L$. The coupling parameter $m(t)$ may in principle be adjusted by changing the number of turns of one of the coils, or the number of turns corresponding to the contact point on one side of an autotransformer, as shown in FIG. 8; in an autotransformer the same (portion of A) coil is shared by two circuits.

An observation is made that the adjustable transformer specified by (31) and (32) is an active device. Consider the case of $i_1=0$, namely the first port is open and the sole power transfer is through the second port. Consider a time interval $[t_0,t_1]$ in which $m(t_0)=m(t_1)$ and $i(t_0)=i(t_1)$. Then the energy supplied to the device $$\mathscr{E} = \int_{t_0}^{t_1} i_2(t)v_2(t)dt = L\int_{t_0}^{t_1} i_2(t)\frac{d(m^2(t)i_2(t))}{dt}dt$$
$$= -L\int_{t_0}^{t_1} m^2(t)i_2(t)\frac{d}{dt}(i_2(t))dt$$
$$= \frac{L}{2}\int_{t_0}^{t_1} \frac{d(m^2(t))}{dt}i_2^2(t)dt.$$

Again E can be negative, e.g., with $m^2(t)$ and $i_2(t)$ chosen as $k(t)$ and $x(t)$ in Example 2. Hence Criterion 1 (passivity) is not satisfied. Consideration is made of the situation in which $\varepsilon=1/L$ tend to zero. From (31), (32), $$\frac{1}{L}\begin{pmatrix} v_1 \\ v_2 \end{pmatrix} = \frac{d}{dt}\begin{pmatrix} i_1 + mi_2 \\ m(i_1 + mi_2) \end{pmatrix} \quad (33)$$

from which it can be deduced that $$v_2 - mv_1 = L\dot{m}\gamma, \quad (34a)$$
$$\dot{\gamma} = v_1/L \quad (34b)$$

where $$\gamma := i_1 + mi_2.$$

It is evidently not straightforward to deduce that $\gamma=0$ (that (29b) holds) from (34b). Even if $\gamma(t_0)=0$, since $\gamma'(t)=o(\varepsilon)$, there could be slow drift in $\gamma$. This could mean that the right hand side of (34a) is non-negligible which would prevent (29a) from holding when m' is non-zero.

The above considerations show that the physical implementation of a lossless adjustable electrical transformer to realize the laws (29a)-(29b) is not straightforward. Industrial implementations of variable transformers, such as the variac, where the contact point A slides vertically, effectively shorts loops as the contact point is being repositioned to correspond to different coupling ratios. An alternative option to move the contact point A displayed in FIG. 8 so as to slide along the coil (as in a balustrade) is not adequate. In such a scheme, a wire with the contact point A as its tip would extend inside the coil as it slides through the opposite side of turns. Nonzero magnetic field lines will then exert forces to be overcome and involving work to be applied.

In the next section an alternative approach is presented to construct a lossless adjustable transformer as envisaged in (29a)-(29b), though consideration is first made of the construction of lossless adjustable inductors and capacitors without resort to such a transformer. Canonical device laws: electrical components. Before considering physical realizability, device laws are specified as follows:

$$v = \ell\frac{d}{dt}(\ell_i) \quad \text{(varinductor)} \quad (35)$$

$$i = c\frac{d}{dt}(cv) \quad \text{(varcapacitor)} \quad (36)$$

where $(v,i)$ are the terminal voltage and current of an electrical one-port and $l(t)$, $c(t)$ are adjustable parameters. An internal energy may be specified by $(\frac{1}{2})l^2i^2$ and $(\frac{1}{2})c^2v^2$ respectively, which shows that the device laws are lossless according to Criterion 2. One approach to the construction of varinductors and varcapacitors is to make use of a mechanical-electrical transducer to convert the mechanical rotary varspring or varinerter into electrical devices. Consider an ideal DC permanent magnet motor-generator with $$v = k_E\omega,$$
$$T = k_T i,$$

where $k_E$ and $k_T$ are the voltage and torque constants satisfying $k_E=k_T$ in SI units. If this is connected across the terminals of a rotary varsping or varinerter then a varinductor or varcapacitor respectively is obtained. Thus physically realization can be made of the varinductor and varcapacitor without resort to an internal power source.

Finally in this section attention turns to the physical realizability of the adjustable electrical transformer. If connection is made of an ideal DC permanent magnet motor-generator to both shafts of the mechanical adjustable transformer (23)-(24) (see FIG. 5) then one obtains a realization of the adjustable electrical transformer (29a)-(29b) without an internal power source.

VIII. CONCLUSION

It is shown that none of the assumed device laws for adjustable springs or inerters or variants are lossless, and indeed are non-passive, namely active. Using an idealized mechanical arrangement of a lever with moveable fulcrum device laws are derived for lossless adjustable springs and inerters. A physical implementation of the moveable fulcrum concept without internal power source is presented for the canonical lossless adjustable spring and inerter which are named the varspring and varinerter. A method for physical implementation of rotary varsprings and varineters is presented. Also included is a discussion of the analogous device laws in the electrical domain.

Example Embodiments. In some embodiments, an adjustable translational mechanical device includes two terminals, wherein the device is configured to operate according to $v(t)=p(t)\cdot D(p(t)\cdot F(t))$, where $v(t)$ is a relative velocity between the terminals, $p(t)$ is an adjustable positive parameter, $F(t)$ is a force between the terminals, and D denotes a differential operator. In some embodiments, an adjustable translational mechanical device includes: a first terminal; a fulcrum; a lever connected to and pivotable about the fulcrum, wherein the lever has a first end and a second end; a spring connected between the first terminal and the first end of the lever; and a second terminal connected to the second end of the lever, wherein the fulcrum is moveable to adjust a parameter of the device. In some embodiments, an adjustable translational mechanical device includes two terminals, wherein the device is configured to operate according to: $F(t)=r(t)\cdot D(r(t)\cdot v(t))$ where $v(t)$ is a relative velocity between the terminals, $r(t)$ is an adjustable positive parameter, $F(t)$ is a force between the terminals, and D denotes a differential operator. In some embodiments, an adjustable translational mechanical device includes: a first terminal; a fulcrum; a lever connected to and pivotable about the fulcrum, wherein the lever has a first end and a second end; an inerter connected between the first terminal and the first end of the lever; and a second terminal connected to the second end of the lever, wherein the fulcrum is moveable to adjust a parameter of the device.

In some embodiments, an adjustable rotational mechanical device includes two terminals, wherein the device is configured to operate according to $w(t)=p(t)\cdot D(p(t)\cdot T(t))$ where $w(t)$ is a relative angular velocity between the terminals, $p(t)$ is an adjustable positive parameter, $T(t)$ is a torque between the terminals, and D denotes a differential operator. In some embodiments, an adjustable rotational mechanical device includes: a first shaft having a first axis; a first cone connected to the first shaft and rotatable about the first axis; a second shaft having a second axis spaced from and parallel to the first axis; a second cone connected to the second shaft and rotatable about the second axis, wherein the second cone has an inverted orientation relative to the first cone; a rolling assembly connected between surfaces of the first cone and the second cone; and a rotary spring connected to the second shaft, wherein the rolling assembly is moveable parallel to the surfaces of the first cone and the second cone to adjust a parameter of the device. In some embodiments, an adjustable rotational mechanical device includes two terminals, wherein the device is configured to operate according to $T(t)=r(t)\cdot D(r(t)\cdot w(t))$ where $w(t)$ is a relative angular velocity between the terminals, $r(t)$ is an adjustable positive parameter, $T(t)$ is a torque between the terminals, and D denotes a differential operator. In some embodiments, an adjustable rotational mechanical device includes: a first shaft having a first axis; a first cone connected to the first shaft and rotatable about the first axis; a second shaft having a second axis spaced from and parallel to the first axis; a second cone connected to the second shaft and rotatable about the second axis, wherein the second cone has an inverted orientation relative to the first cone; a rolling assembly connected between surfaces of the first cone and the second cone; and a rotary inerter connected to the second shaft, wherein the rolling assembly is moveable parallel to the surfaces of the first cone and the second cone to adjust a parameter of the device.

In some embodiments, an adjustable translational mechanical device includes four terminals, wherein the device is configured to operate according to $F_1(t)=p(t)\cdot F(t)$ and $v_1(t)=-v(t)/p(t)$, where $F_1(t)$ is a force between a first pair of the terminals, $F(t)$ is a force between a second pair of the terminals, $p(t)$ is an adjustable positive parameter, $v_1(t)$ is a relative velocity between the first pair of the terminals, and $v(t)$ is a relative velocity between the second pair of the terminals.

In some embodiments, an adjustable rotational mechanical device includes four terminals, wherein the device is configured to operate according to $T_1(t)=p(t)\cdot T(t)$ and $w_1(t)=-w(t)/p(t)$ where $w_1(t)$ is a relative angular velocity between a first pair of the terminals, $w(t)$ is a relative angular velocity between a second pair of the terminals, $p(t)$ is an adjustable positive parameter, $T_1(t)$ is a torque between the first pair of the terminals, and $T(t)$ is a torque between the second pair of the terminals. In some embodiments, an adjustable rotational mechanical device includes: a first shaft having a first axis; a first cone connected to the first shaft and rotatable about the first axis; a second shaft having a second axis spaced from and parallel to the first axis; a second cone connected to the second shaft and rotatable about the second axis, wherein the second cone has an inverted orientation relative to the first cone; and a rolling assembly connected between surfaces of the first cone and the second cone, wherein the rolling assembly is moveable parallel to the surfaces of the first cone and the second cone to adjust a parameter of the device.

In some embodiments, an adjustable rotational mechanical device includes: a first shaft having a first axis; a first cone connected to the first shaft and rotatable about the first axis; a second shaft having a second axis spaced from and parallel to the first axis; a second cone connected to the second shaft and rotatable about the second axis, wherein the second cone has an inverted orientation relative to the first cone; and a rolling assembly connected between surfaces of the first cone and the second cone, wherein the rolling assembly is moveable parallel to the surfaces of the first cone and the second cone to adjust a parameter of the device, and wherein the rolling assembly includes rotatable ball bearings which are constrained to rotate and transmit forces in two rotational degrees of freedom corresponding to a rotation of the first cone and the second cone, and a movement of the rolling assembly.

In some embodiments, an adjustable rotational mechanical device includes: a first shaft having a first axis; a first cone connected to the first shaft and rotatable about the first axis; a second shaft having a second axis collinear with the first axis; a second, hollow cone connected to the second shaft and rotatable about the second axis, wherein the first cone is disposed at least partially within and spaced from the second, hollow cone; and at least one rolling assembly connected between the first cone and the second, hollow cone, wherein each rolling assembly is moveable parallel to surfaces of the first cone and the second, hollow cone to adjust a parameter of the device.

As used herein, the term "set" refers to a collection of one or more objects. Thus, for example, a set of objects can include a single object or multiple objects.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be "substantially" or "about" the same as or equal to a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claim(s). In addition, many modifications may be made to adapt a particular situation, material, composition of matter, method, operation or operations, to the objective, spirit and scope of the disclosure. All such modifications are intended to be within the scope of the claim(s) appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. An apparatus comprising:
an adjustable device, wherein the adjustable device comprises one of an adjustable translational mechanical device, an adjustable rotational mechanical device or an adjustable electrical device, and wherein the adjustable device comprises an adjustable rotational mechanical device, the adjustable device including:
a plurality of terminals,
an assembly that is freely and independently moveable between internal components of the adjustable device, wherein a movement between the internal components causes a parameter of the adjustable device to be changed, and
a linear actuator coupled to the assembly that is configured to impose the movement that causes the parameter of the adjustable device to be changed,
wherein the internal components include a pair of rotating cones having respective surfaces separated by a gap having a fixed distance between the respective surfaces, and the assembly is moveable in the gap, and
wherein a first one of the cones is fixed with only a freedom of rotation, and wherein a second one of the cones has both a freedom of rotation and another freedom of movement with respect to the first one of the cones.

2. The apparatus of claim 1, wherein the plurality of terminals comprises two terminals, and wherein the adjustable device is configured to operate according to $w(t)=p(t) \cdot D(p(t) \cdot T(t))$ where $w(t)$ is a relative angular velocity between the terminals, $p(t)$ is an adjustable positive parameter, $T(t)$ is a torque between the terminals, and $D$ denotes a differential operator.

3. The apparatus of claim 1, wherein the plurality of terminals comprises two terminals, and wherein the adjustable device is configured to operate according to $T(t)=r(t) \cdot D(r(t) \cdot w(t))$ where $w(t)$ is a relative angular velocity between the terminals, $r(t)$ is an adjustable positive parameter, $T(t)$ is a torque between the terminals, and $D$ denotes a differential operator.

4. The apparatus of claim 1, wherein the assembly includes a pair of spherical balls which are constrained to rotate between the internal components of the adjustable device and to allow for the movement imposed by the linear actuator.

5. The apparatus of claim 1, further comprising a spring mechanism to impose a force against the another freedom of movement.

6. The apparatus of claim 5, wherein the another freedom of movement is in an axial direction with respect to the freedom of rotation.

7. An adjustable rotational mechanical device comprising:
a first shaft having a first axis;
a first cone connected to the first shaft and rotatable about the first axis;
a second shaft having a second axis aligned to the first axis;
a second cone connected to the second shaft and rotatable about the second axis; and
a rolling assembly connected between surfaces of the first cone and the second cone to transmit torque between the first and second cones, wherein the rolling assembly is freely and independently moveable parallel to the surfaces of the first cone and the second cone to adjust a ratio between the torques and angular velocities of the first and second cones,
wherein the first cone is fixed with only a freedom of rotation, and wherein the second cone has both a freedom of rotation and another freedom of movement with respect to the first cone.

8. The adjustable rotational mechanical device of claim 7, wherein the second axis is spaced from and parallel to the first axis, and wherein the second cone has an inverted orientation relative to the first cone.

9. The adjustable rotational mechanical device of claim 8, further comprising:
a rotary mechanical one-port connected to the second shaft.

10. The adjustable rotational mechanical device of claim 9, wherein the mechanical one port comprises a spring.

11. The adjustable rotational mechanical device of claim 7, wherein the rolling assembly includes a pair of spherical balls which are constrained to rotate between the surfaces of the first cone and the second cone and to allow for the movement parallel to the surfaces.

12. The adjustable rotational mechanical device of claim 7, further comprising a linear actuator coupled to the rolling assembly and to impose the movement.

13. The adjustable rotational mechanical device of claim 7, further comprising a spring mechanism to impose a force against the another freedom of movement.

14. The adjustable rotational mechanical device of claim 13, wherein the another freedom of movement is in an axial direction with respect to the freedom of rotation.

* * * * *